April 25, 1967    P. HAAKE    3,315,892
METHOD OF MEASURING THE TEMPERATURE PREVAILING IN A BATH AND
A SYSTEM FOR MAINTAINING A PREDETERMINED TEMPERATURE
WITHIN AN ARTICLE
Filed Feb. 2, 1965
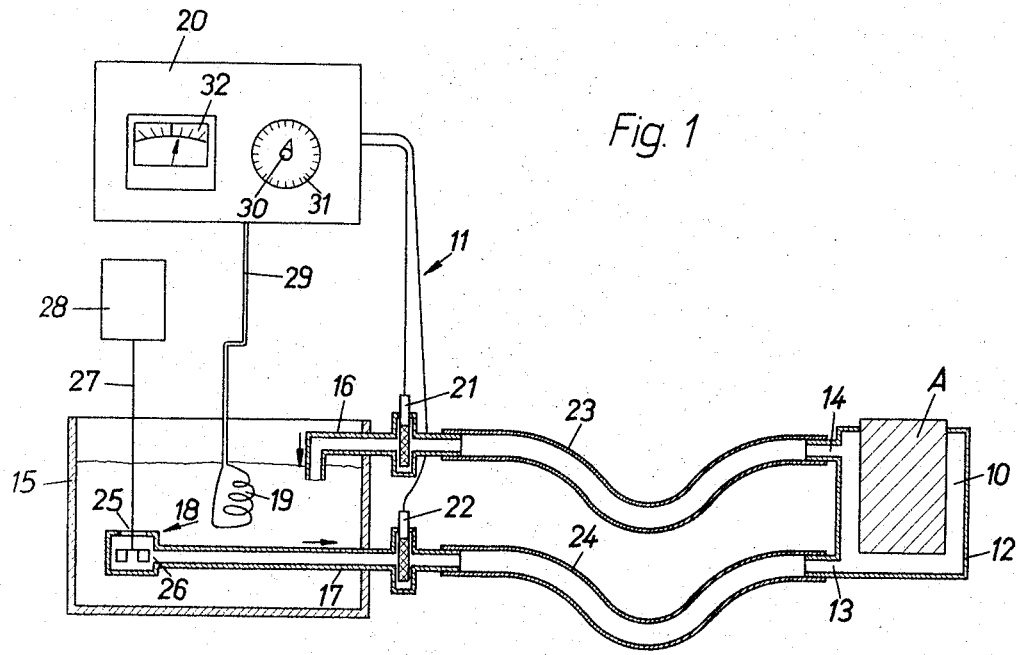
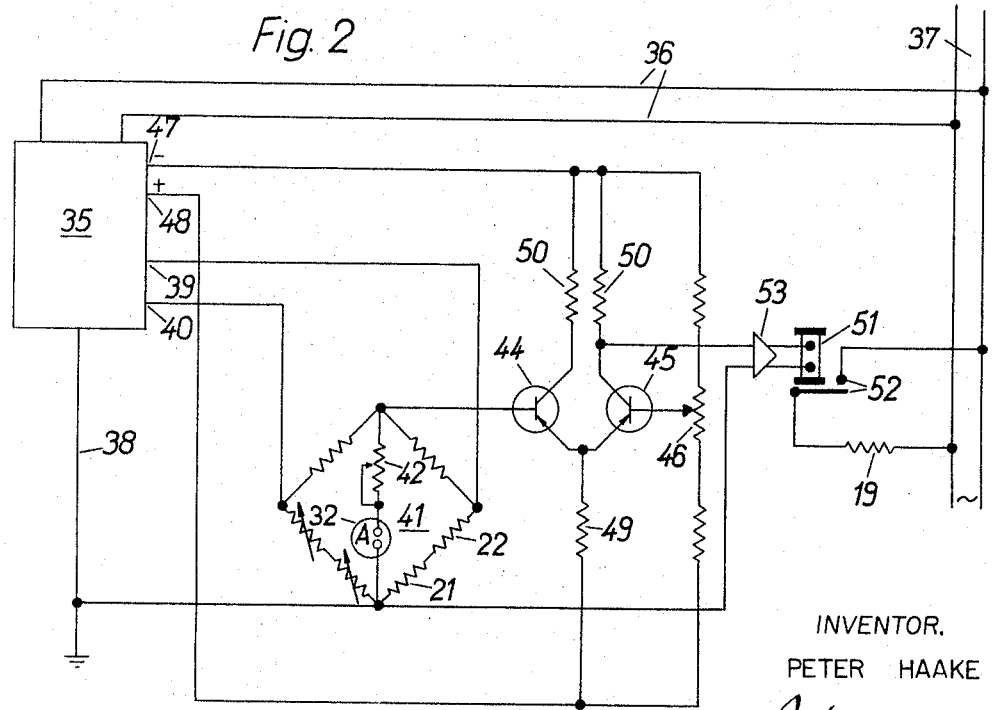
INVENTOR.
PETER HAAKE
BY
Attorney 3,315,892
Patented Apr. 25, 1967

3,315,892
METHOD OF MEASURING THE TEMPERATURE PREVAILING IN A BATH AND A SYSTEM FOR MAINTAINING A PREDETERMINED TEMPERATURE WITHIN AN ARTICLE
Peter Haake, 6 Stettiner Strasse, Karlsruhe, Germany
Filed Feb. 2, 1965, Ser. No. 429,781
Claims priority, application Germany, Feb. 7, 1964,
H 51,622
3 Claims. (Cl. 237—8)

My invention relates to a system for maintaining a predetermined temperature within an article, said system comprising a bath in which the article is immersed and a temperature-conditioning unit provided in spaced relationship to the bath and including pumping means for circulating a fluid through said unit and through said bath, the unit including a container surrounding the pump, a heating or cooling element and a temperature-responsive element which measures the temperature of the fluid circulated through the container and the bath by the pump for the purpose of controlling the heating or cooling element.

In prior systems of this kind there is provided a single temperature-responsive element in the container serving the purpose of measuring the temperature of the circulating liquid, such temperature determining that of the bath and of the article immersed therein. Under normal conditions, however, the temperature measured by the single temperature-responsive element provided in the container is not exactly identical with that of the article because a certain, even though small, drop of temperature invariably exists between the container and the bath. Measuring the temperature of the article directly by applying thereto the temperature-responsive element is not always feasible or practical, particularly where the bath is formed by a sealed vessel in which the circulating liquid is maintained under a certain pressure.

It is the object of my invention to provide an improved method and an improved system for detecting the temperature prevailing within the bath without requiring the insertion of a temperature-responsive element into the bath or into the article immersed therein. More particularly, it is an object of my invention to detect and control the temperature prevailing within the bath with great accuracy by means coordinated to the temperature-conditioning and pumping unit.

Further objects of my invention will appear from the description following hereinafter of a preferred embodiment of my invention illustrated in the accompanying drawings. I wish it to be understood, however, that my invention is in no way restricted or limited to the details of such embodiment but is capable of numerous modifications within the scope of the appended claims.

In the drawings:
FIG. 1 is a diagrammatic illustration of a system comprising a bath and a separate temperature-conditioning unit through which a liquid is circulated, said system embodying my invention and
FIG. 2 is an electrical circuit diagram of the control means included in the system shown in FIG. 1.

The system shown in FIG. 1 serves the purpose of maintaining a predetermined temperature within an article A immersed in a bath 10. For this purpose a liquid is circulated through the bath 10 and through a temperature-conditioning unit 11 in which the temperature of the liquid is so conditioned and controlled as to be maintained at the desired temperature.

The bath 10 is contained in a vessel 12 having an admission port 13 near its bottom and an outlet port 14 near its top.

The temperature-conditioning unit 11 comprises a container 15 provided with a pair of pipes 16 and 17 extending through the wall of the container 15, a pump 18, a heating element 19, a control unit 20 and temperature-responsive elements 21 and 22.

The outer ends of the pipes 16 and 17 are connected to the inlet and outlet ports 13 and 14, respectively, by flexible pipes 23 and 24. The pump 18 has a suction port 25 and a pressure port 26. The pressure port 26 communicates with the pipe 17, whereas the suction port 25 and the pipe 16 freely communicate with the interior of the container 15 which is filled with the liquid. The rotor of the centrifugal pump 18 has a shaft 27 extending upwardly out of the container 15 and being coupled to an electric motor 28.

The heating element 19 is disposed between the inner end of pipe 16 and the suction port 25 of the pump and is connected by a suitable electrical cable 29 to the control unit 20.

When the pump is in operation it circulates the liquid through its pressure port 26, pipe 17, flexible pipe 24, admission port 13 of bath 10, discharge port 14 of the bath, flexible pipe 23, and pipe 16 back to the interior of container 15 where the liquid enters suction port 25 of the pump.

For the purpose of accurately detecting the temperature of the article A immersed in bath 10 I have equipped the temperature-conditioning unit 11 with the pair of temperature-responsive elements 21 and 22, the element 21 being inserted in pipe 16 and the element 22 being inserted in pipe 17 both being provided adjacent to the wall of the container 15 on the outside thereof.

In the embodiment shown each of the elements 21 and 22 is formed by a resistor of the type responding to a change of temperature by changing its resistance, such as a platinum wire.

The control unit 20 is provided with a device 30 adjustable in accordance with the desired temperature of the bath. The device 30 has a knob for manual rotation and a circular dial 31 provided with a scale indicating centigrades. The knob is provided with a hand cooperating with a circular scale of the dial. Moreover, the control unit 20 is provided with an indicating instrument 32 indicating the average of the temperatures measured by the elements 21 and 22. I have found that this average very closely equals the temperature prevailing within the article A.

As shown in FIG. 2, the control unit 20 includes a transformer and rectifier unit 35 connected by wires 36 to a power line 37 supplying alternating current and by a wire 38 to the ground. Unit 35 includes a source of direct current comprising terminals 39 and 40 connected to a Wheatstone bridge 41. One side of this bridge includes the elements 21 and 22 and the other sides include suitable resistors some of which may be adjustable. The diagonal lead includes an ammeter A which forms the indicating instrument 32. It is arranged in series with an adjustable resistor 42 which can be so adjusted that the indication of the instrument 32 represents the true average of the temperatures to which the elements 21 and 22 are subjected.

One end of the diagonal lead of bridge 41 is connected by a wire 43 to ground whereas the other end is connected with the base of a transistor 44. A second transistor 45 has its base connected to the sliding contact of a potentiometer 46 inserted in a line connecting terminals 47 and 48 of a second source of direct current formed by unit 35. The emitters of the transistors 44 and 45 are connected by a common resistor 49 to the positive terminal 48 whereas the collectors of the transistors are connected through resistors 50 with the negative terminal 47.

Moreover, the collector of transistor 45 is connected to one terminal of the input of an amplifier 53 the other terminal of which is grounded. The output of amplifier 53 is connected to a relay coil 51.

A normally open pair of contacts 52 of the relay is inserted between one terminal of heating coil 19 and one terminal of the source 37 of alternating current whereas the other terminal of heating coil 19 is connected to the other terminal of source 37. The wiper contact of potentiometer 46 is connected with the adjustable device 30 being coupled with the knob thereof.

The control unit operates as follows: The Wheatstone bridge 41 represents a first means connected to the temperature-responsive elements 21 and 22 for producing a voltage proportional to the average of the responses of these elements. This voltage is applied to the basis of transistor 44. Hence, this voltage is indicative of the temperature prevailing in the bath 10.

The potentiometer 46 constitutes a second means connected with the adjustable device 30 for producing a voltage proportional to the desired temperature.

The transistors 44 and 45 constitute amplifying means having an input connected to the first means, to wit the Wheatstone bridge, and to said second means 46 and having an output formed by the collector of transistor 45 connected with relay coil 51. Whenever the voltage applied by the Wheatstone bridge to transistor 44 and representing the average of the responses of elements 21 and 22 is lower than the voltage of sliding contact of potentiometer 46 representing the desired temperature, the transistor 45 will become conductive and will cause energization of relay coil 51 whereby the heating element 19 will be put in operation and will raise the temperature of the circulating liquid thereby raising the temperature measured by element 22 to a degree causing the voltage supplied to transistor 44 to block transistor 45. As a result, relay 51 will be de-energized and heating element 19 will cease to heat the liquid. In this manner, the control unit 20 will automatically keep the average temperature at the level predetermined by adjustment of device 30.

From the above it will appear that my novel method of measuring the temperature prevailing in the bath 10 through which the temperature-controlling liquid is circulated flowing through an admission duct formed by pipes 17 and 24 and through a discharge duct formed by pipes 23 and 16 and by the interior of container 15 comprises the steps of measuring the admission temperature prevailing within the admission duct 17, 24, measuring the discharge temperature prevailing within the discharge duct 23, 16 and obtaining the average of these temperatures, for instance by means of the Wheatstone bridge 41. More particularly, my method comprises the steps of measuring the temperature prevailing in the admission duct at a point closer to pump 18 than to the bath 10, measuring the temperature prevailing within the discharge duct at a point closer to pump 18 than to bath 10 and obtaining the average value of the measured temperatures, the average being indicaated for instance by instrument 32.

In the embodiment shown the method includes the steps of forming a signal, for instance the voltage applied by the Wheatstone bridge 41 to transistor 44, corresponding to the average of the temperatures measured by elements 21 and 22, comparing this signal with the desired temperature of the bath represented, for instance, by the voltage of wiper contact of potentiometer 46, comparing said signal with the desired temperature of the bath to determinne the difference thereof from said average, forming a control signal, for instance the voltage applied to the relay coil 51, depending on said difference and applying a heat treatment, for instance by element 19, to the liquid on its way from the discharge duct 23, 16 to the admission duct 24, 17, said heat treatment being such as to minimize said difference.

The heating element 19 constitutes an example of temperature-changing means. If desired, the heat-changing means may be in the form of a suitable cooling device controlled by contacts 52.

As such cooling devices are well known in the art and do not form part of my invention, a description thereof is deemed dispensable herewith.

My invention is of particular utility in cases where the article A represents a variable heat load, for instance owing to exothermic chemical reactions or owing to variable heat transfer conditions as may be caused by action of air draft, by intense sunlight, by changes of room temperature or by variations of the mass of the article. In these cases the temperature drop existing between the caloric fluid and the article changes. Heretofore it was not possible to effectively balance such variations by controlling the temperature of the fluid.

The average of the responses of the elements 21 and 22 equals the true temperature of article A very closely, provided that the admission duct is symmetrically shaped and located with respect to the discharge duct. This symmetry has been achieved in FIG. 1 by spacing the ports 13 and 14 equal distances from the container 15 and by using pipes 23 and 24 of equal length and equal diameters.

Another advantage of my novel system described hereinabove follows from the relatively short distance between the heat sensing elements and the temperature-changing means, such as heating coil 19. As a result, the tendency of the control system to hunting is minimized.

If desired, the temperature-responsive elements 21 and 22 may be formed by thermo-couples or any otner elements capable of responding to the temperature.

While in the particular embodiment described the caloric fluid is a liquid, I may use a gaseous fluid, if desired, or liquids of a low specific heat. The use of such fluids will result in high temperature drops between the article A and the temperature-conditioning unit 11. Because of this high drop of temperature such fluids could not be used heretofore.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a system of the character described, the combination comprising a container, a pair of pipes extending through the walls thereof and being adapted to be connected to inlet and outlet ports, respectively, of a bath, a heating element in said container, a pump disposed within said container and provided with a suction port and a pressure port, said pressure port communicating with one of said pipes, whereas said suction port and the other one of said pipes freely communicate with the interior of said container, temperature-responsive elements mounted within said pipes adjacent to the wall of said container, an adjustable device adapted to be adjusted in accordance with the desired temperature of said bath, control means connected with said adjustable device, with said temperature-responsive elements and with said heating element, said control means being responsive to the average of the responses of said temperature-responsive elements and being operative to so control said heating element as to change the temperature of a fluid in said container in a manner rendering the difference of said average from said desired temperature to a minimum.

2. The combination claimed in claim 1 in which each of said temperature-responsive elements is a resistor of the type responding to a change of temperature by changing its resistance, said control means including first means connected to said temperature-responsive elements for producing a voltage proportional to the average of the responses of said temperature-responsive elements, second means connected with said adjustable device for producing a voltage proportional to said desired temperature, amplifying means having an input connected to said first means and to said second means and an output producing an output voltage, when said average is lower than said output and including contacts connected to said heating element and to a source of current for putting said heating element in operation, when said relay is energized by said output voltage.

3. A system of the character described comprising a vessel containing a bath for accommodating an article to be subjected to the temperature of said bath, said vessel having an admission port and an outlet port, a pump spaced from said vessel and having a pressure port and a suction port, an admission duct connecting said pressure port to said admission port, a discharge duct connecting said outlet port to said suction port, said vessel, said ducts and said pump constituting a fluid circuit, temperature-changing means in heat exchange relationship to said circuit at a point spaced from said vessel, a temperature-responsive element coordinated to said admission duct, a temperature-responsive element coordinated to said discharge duct, an adjustable device adapted to be adjusted in accordance with the desired temperature of said bath, control means connected with said adjustable device, with said elements and with said temperature-changing means, said control means being responsive to the average of the responses of said elements and being operative to so control said temperature-changing means as to change the temperature of the fluid in said circuit in a manner reducing the difference of said average from said desired temperature to a minimum, said discharge duct including a pipe and a container which surrounds said pump and said temperature-changing means and communicates with said suction port of said pump and with said pipe, said temperature-responsive elements being disposed outside of and close to said container.

References Cited by the Examiner
UNITED STATES PATENTS

| 1,896,953 | 2/1933 | Hassell | 128—400 |
| 2,136,559 | 11/1938 | Miller | 236—91 X |
| 2,726,658 | 12/1955 | Chessey | 128—400 |
| 2,944,422 | 7/1960 | Wald | 73—342 |
| 3,074,410 | 1/1963 | Foster | 128—400 |
| 3,112,880 | 12/1963 | Pollock | 73—341 |
| 3,236,099 | 2/1966 | Warther | 73—349 |

LOUIS R. PRINCE, *Primary Examiner.*

N. B. SIEGEL, *Assistant Examiner.*